(12) United States Patent
Gotou

(10) Patent No.: US 8,386,536 B2
(45) Date of Patent: Feb. 26, 2013

(54) GATEWAY SERVER, FILE MANAGEMENT SYSTEM, AND FILE MANAGEMENT METHOD AND PROGRAM

(75) Inventor: Jun Gotou, Tokyo (JP)

(73) Assignee: NEC Corporation, Tokyo (JP)

( * ) Notice: Subject to any disclaimer, the term of this patent is extended or adjusted under 35 U.S.C. 154(b) by 334 days.

(21) Appl. No.: 12/628,379

(22) Filed: Dec. 1, 2009

(65) Prior Publication Data

US 2010/0138430 A1     Jun. 3, 2010

(30) Foreign Application Priority Data

Dec. 1, 2008   (JP) ................... 2008-306022

(51) Int. Cl.
G06F 12/00 (2006.01)
G06F 17/30 (2006.01)
G06F 7/04 (2006.01)
(52) U.S. Cl. ........... 707/821; 707/754; 707/783; 726/27
(58) Field of Classification Search .................. None
See application file for complete search history.

(56) References Cited

U.S. PATENT DOCUMENTS

| 7,042,988 | B2 * | 5/2006 | Juitt et al. | 379/88.17 |
| 2007/0244975 | A1 * | 10/2007 | Dillon et al. | 709/206 |

FOREIGN PATENT DOCUMENTS

| JP | 10-21174 A | 1/1998 |
| JP | 10-116293 A | 5/1998 |
| JP | 11-353278 A | 12/1999 |
| JP | 2001075850 A | 3/2001 |
| JP | 2002073401 A | 3/2002 |
| JP | 2002342144 A | 11/2002 |
| JP | 2003030026 A | 1/2003 |
| JP | 2003196191 A | 7/2003 |
| JP | 2003345709 A | 12/2003 |
| JP | 2004110549 A | 4/2004 |
| JP | 2008025369 A | 10/2008 |

OTHER PUBLICATIONS

Japanese Office Action for JP2008-306022 issued Dec. 27, 2010.
Japanese Office Action for JP2008-306022 issued Oct. 8, 2010.

* cited by examiner

*Primary Examiner* — Pierre Vital
*Assistant Examiner* — Berhanu Mitiku

(57) ABSTRACT

With a new function introduced neither to a file server nor to a client terminal, control of displaying only a file or a folder whose access right is held by a user is enabled by using existing file server and client terminal. A gateway server connected to a file server and a client terminal through a network, which has the function of filtering structure information of a folder and a file that the file server has based on access authorization of a user of the client terminal on the user basis and presenting the filtered structure information of the folder and the file to the client terminal of a user who has access authorization for the folder and the file.

18 Claims, 9 Drawing Sheets

FIG. 3

| SHARED FOLDER NAME ON GATEWAY | FILE SERVER NAME OF MOUNTING DESTINATION | SHARED FOLDER ON FILE SERVER |
|---|---|---|
| SHARED HOLDER A27 | ¥¥FILE SERVERA11 | SHARED FOLDER A13 |
| SHARED HOLDER A28 | ¥¥FILE SERVERA12 | SHARED FOLDER A20 |

FIG. 4

| USER NAME ON GATEWAY | FILE SERVER NAME OF MOUNTING DESTINATION | USER ID OF FILE SERVER OF MOUNTING DESTINATION | USER PASSWORD OF FILE SERVER OF MOUNTING DESTINATION |
|---|---|---|---|
| USER A1 | ¥¥FILE SERVERA11 | USER A30 | ********* |
| USER A29 | ¥¥FILE SERVERA11 | USER A31 | ********* |
| USER A1 | ¥¥FILE SERVERA12 | USER A30 | ********* |
| USER A29 | ¥¥FILE SERVERA12 | USER A32 | ********* |

FIG. 5

| USER NAME ON GATEWAY SERVER | USER PASSWORD |
|---|---|
| USER A1 | ********* |
| USER A29 | ********* |

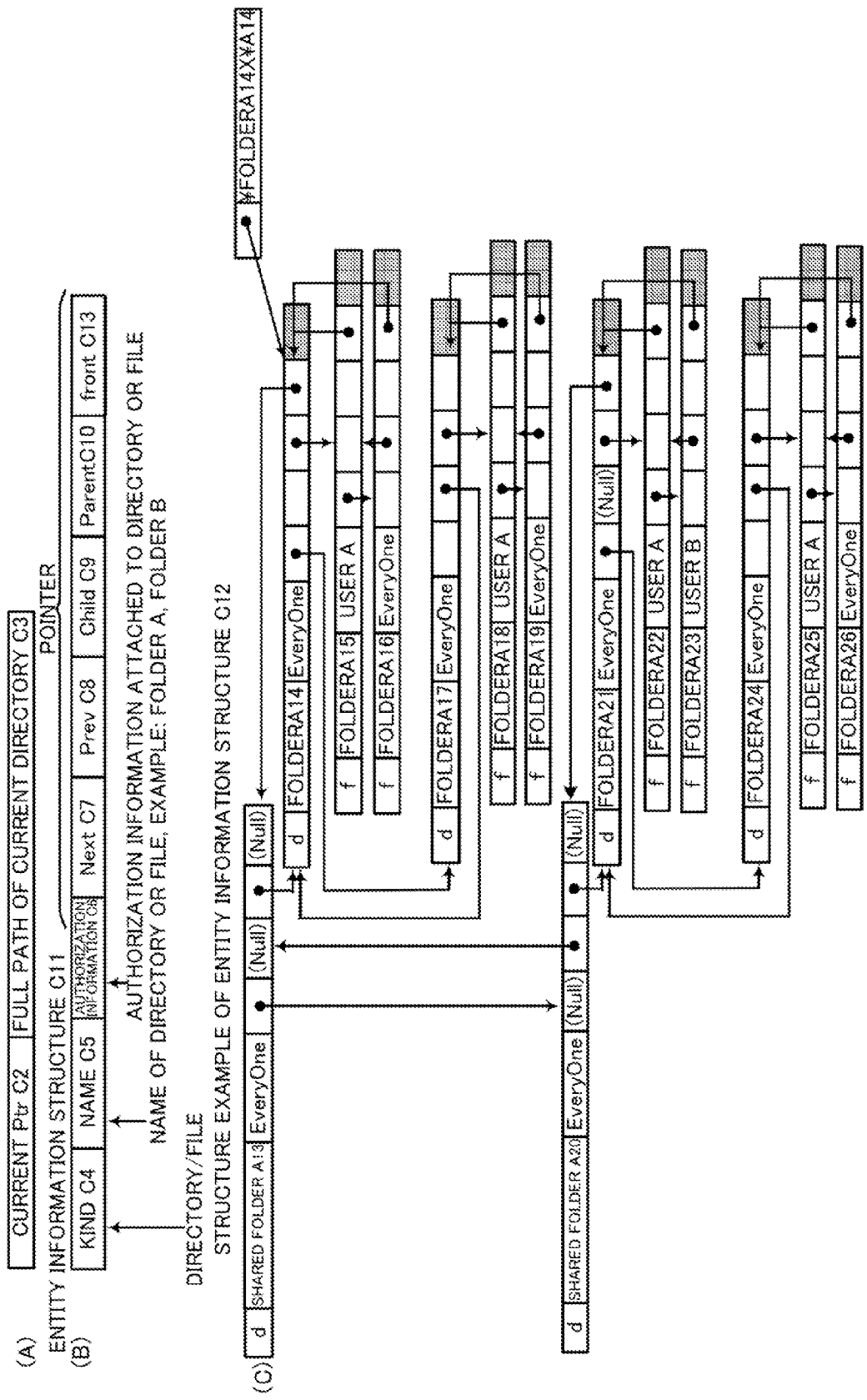

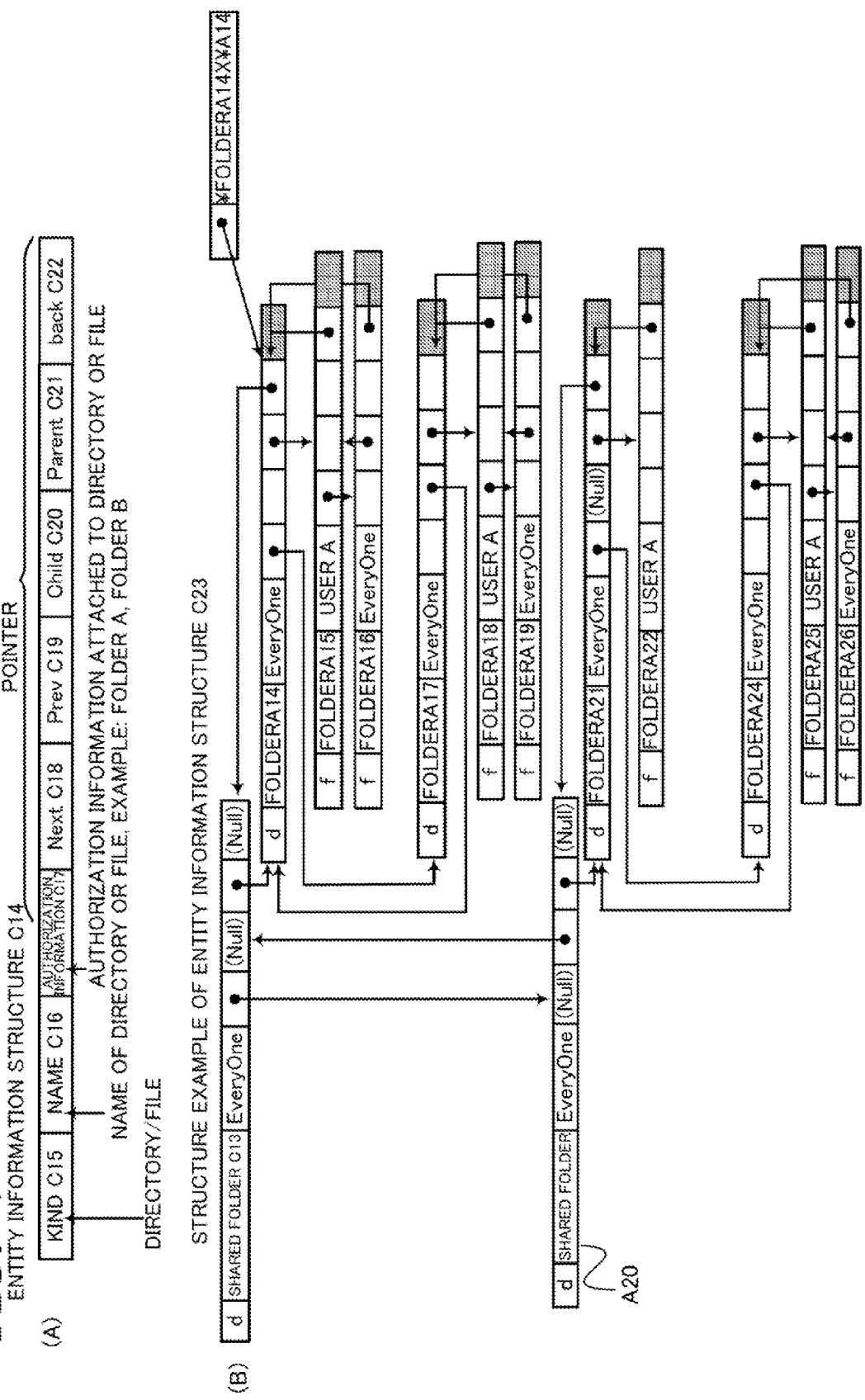

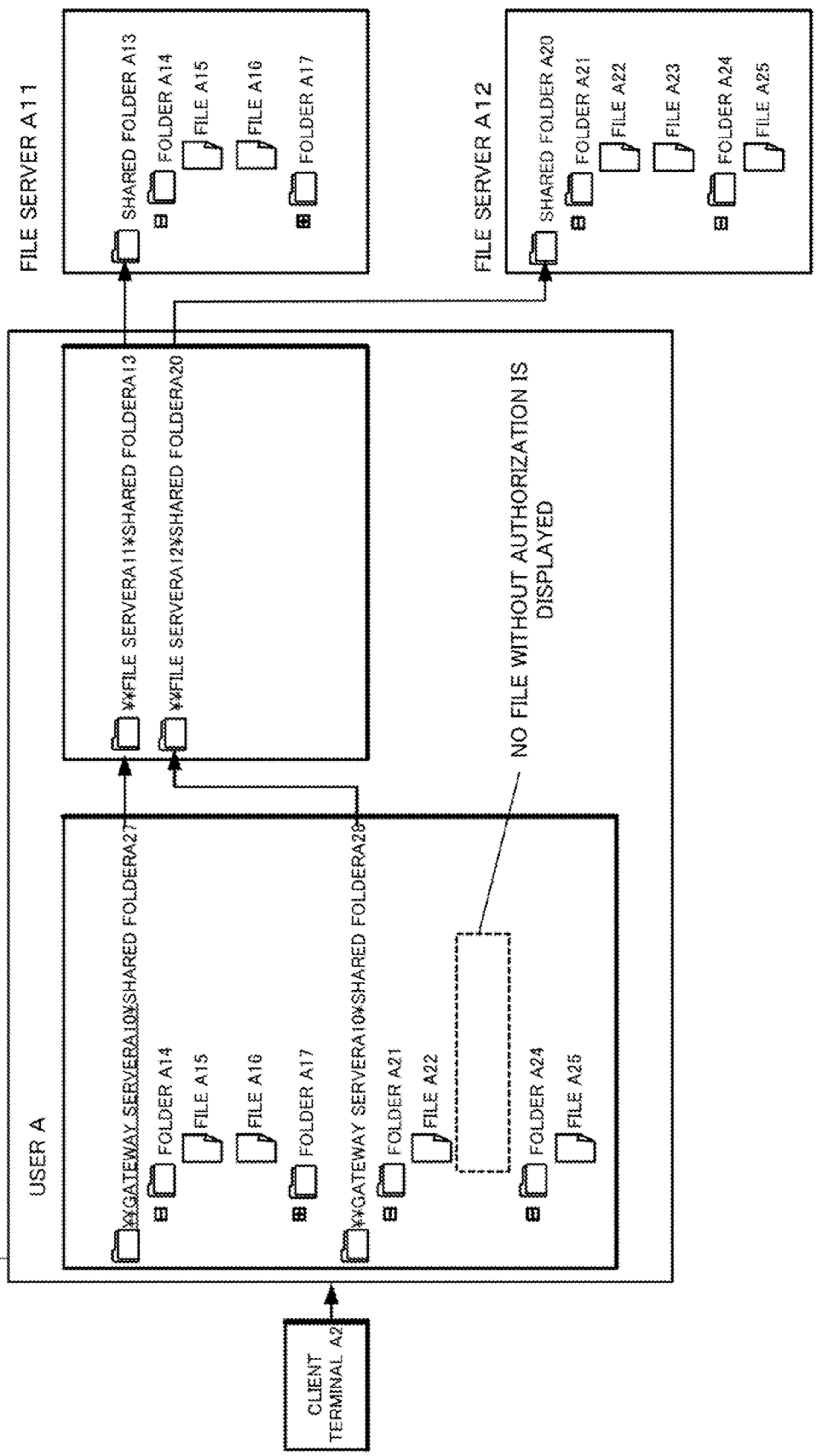

GATEWAY SERVER, FILE MANAGEMENT SYSTEM, AND FILE MANAGEMENT METHOD AND PROGRAM

INCORPORATION BY REFERENCE

This application is based upon and claims the benefit of priority from Japanese patent application No. 2008-306022, filed on Dec. 1, 2008, the disclosure of which is incorporated herein in its entirety by reference.

TECHNICAL FIELD

The present invention relates to a gateway server arranged between a file server and a user's client terminal, a file management system using a gateway server, and file management method and program.

BACKGROUND ART

In recent years, with information leakage frequently occurring, recommended is operation of reducing a risk of information leakage by storing a classified file into a server and managing the same. In this case, since preparing a storage region for each user costs much, a file is stored on a file server accessible in common by a plurality of users and managed.

Such management of a file, however, has a problem that when a user accesses a file server from a client terminal, a file whose access authorization is held by the user himself and other files are displayed in a list to make management complicated.

In a file system provided by an OS (Operating System) currently used in common such as Windows, for example, structure of a file or a directory can be displayed only in a manner as registered on the file system. In addition, it is only possible to rearrange the order of displaying under a certain condition such a file name.

Related art solving such problems as described above is disclosed, for example, in Patent Document 1. Disclosed in the system recited in Patent Document 1 is a technique that when a user having an access right only to a folder A out of folders A and B logs in a server device which provides file sharing service, for example, only an icon indicating the folder A is displayed on a client device of the user.

Patent Document 1: Japanese Patent Laying-Open No. 2004-110549

As described above, a file system provided by an OS (Operating System) has a problem of complicated management because a file whose access right is held by a user and other files are displayed together as a list.

Related art recited in Patent Document that can solve the problem also has a shortcoming in requiring, in each server device which provides file sharing service, introduction of a function (program) of enabling only a folder whose access right is held by a user to be displayed on a client device of the user and introduction of software into the client device as well that is applicable to a corresponding function of the server device, which introductions are hard to be realized by existing file server and client device. In particular, systems having numbers of file servers require enormous costs and labor for the introduction.

As described in the foregoing, displaying with a structure flexibly changed has been impossible such as displaying only a file or a folder related to a user with neither change of such software on a client terminal as a file explorer nor introduction of a special function of changing a folder structure of a file server.

In view of the above-described problems, an object of the present invention is to provide a gateway server, a file management system, and file management method and program which enable control such as displaying only a file or a folder whose access right is held by a user to be realized by using existing file server and client terminal without introducing a new function into a file server and a client terminal.

SUMMARY

According to a first exemplary aspect of the invention, a gateway server connected to a file server and a client terminal through a network, includes a unit that filters structure information of a folder and a file that the file server has based on access authorization of a user of the client terminal on the user basis and presents the filtered structure information of the folder and file to the client terminal of a user who has access authorization for the folder and the file.

According to a second exemplary aspect of the invention, a file management method of a file management system including a file server, a gateway server and a client terminal which accesses a folder and a file on the file server through the gateway server, wherein at the gateway server, filtering structure information of a folder and a file that the file server has based on access authorization of a user of the client terminal on the user basis and presenting the filtered structure information of the folder and file to the client terminal of a user who has access authorization for the folder and the file.

According to a third exemplary aspect of the invention, a computer readable medium storing a file management program operable on a gateway server connected to a file server and a client terminal through a network, wherein the file management program causes the gateway server to execute a processing of filtering structure information of a folder and a file that the file server has based on access authorization of a user of the client terminal on the user basis and presenting the filtered structure information of the folder and file to the client terminal of a user who has access authorization for the folder and the file.

The present invention enables control of displaying only a file or a folder whose access right is held by a user by using existing file server and client terminal without introducing a new function to a file server and a client terminal.

BRIEF DESCRIPTION OF THE DRAWINGS

FIG. 3 is a diagram showing an example of contents of a management table managed by a file server link information management unit according to the first exemplary embodiment;

FIG. 4 is a diagram showing an example of a table in which correlation information of user information is managed by a user authentication information management unit according to the first exemplary embodiment;

FIG. 5 is a diagram showing an example of a table in which a user ID and a password that manage a user on a file server are correlated with each other according to the first exemplary embodiment;

FIG. 6 is a diagram showing a current information structure and an entity information structure as a data structure to be managed in a file server structure information management unit according to the first exemplary embodiment;

FIG. 7 is a diagram showing an entity information structure as a data structure to be managed in a file folder information filtering control unit according to the first exemplary embodiment;

FIG. 8 is a diagram showing one example of display of only a file and a holder whose access rights are held by a user who accesses the gateway server according to the first exemplary embodiment;

EXEMPLARY EMBODIMENT

In the following, embodiments of the present invention will be detailed with reference to the drawings.

First Exemplary Embodiment

Figure 1:
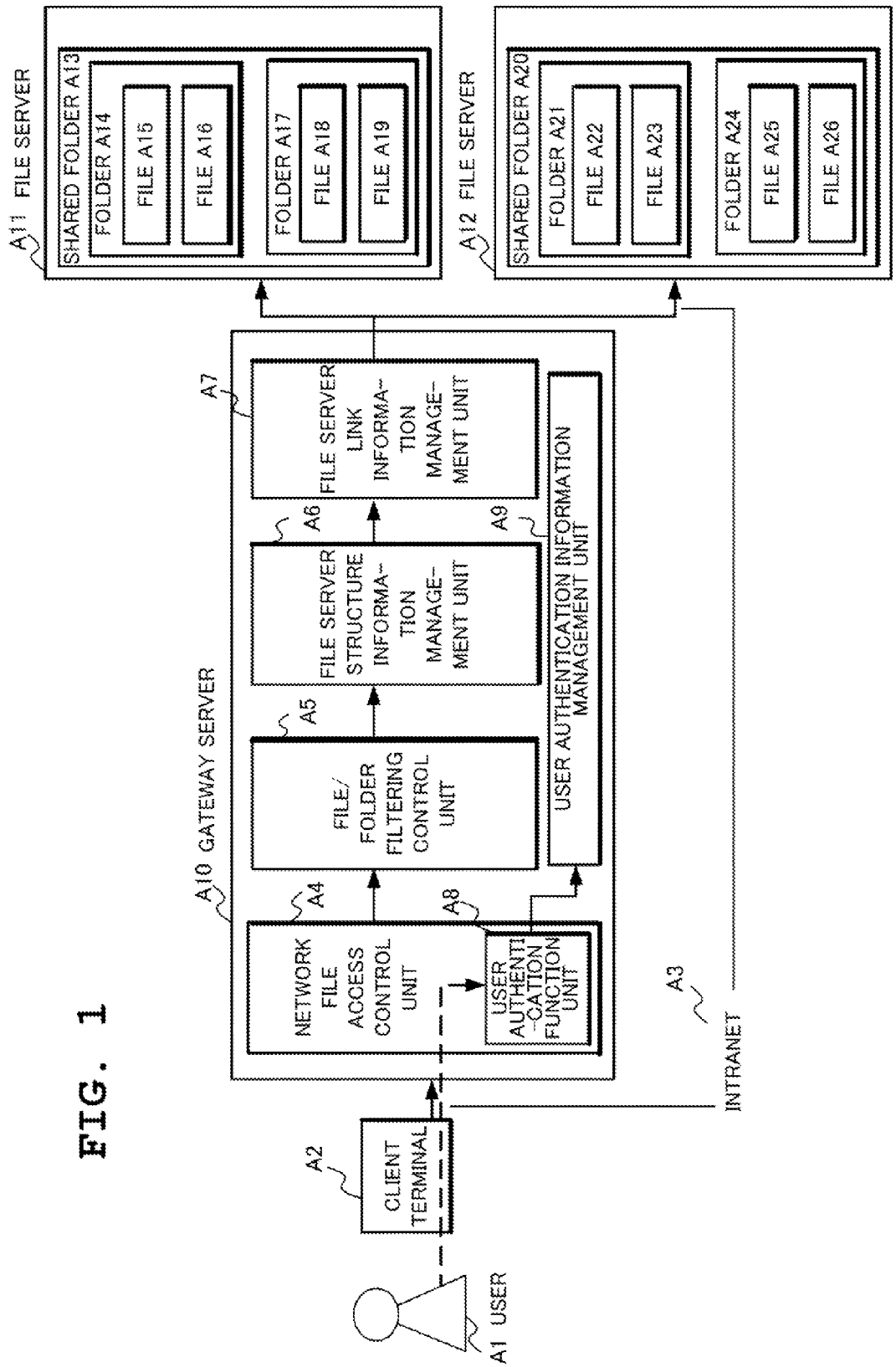
FIG. 1 is a diagram showing an example of configuration of a file management system according to a first exemplary embodiment of the present invention.

FIG. 1 shows an example of configuration of a file management system according to the first exemplary embodiment of the present invention. The file management system according to the first exemplary embodiment comprises a client terminal A2, a gateway server A10, file servers A11 and A12 and a communication network A3 such as an intranet.

The client terminal A2 has a function of accessing the communication network A3 such as the Internet and a function of accessing the gateway server A10 by using a common access means such as the SMB protocol or the CIFS protocol.

The file servers A11 and A12 have a function of publicizing files to the client terminal A2 or other server by using a common protocol for file sharing such as the SMB protocol or the CIFS protocol, a function of defining an access right to files to be publicized, A15, A16, A18, A19, A22, A23, A25 and A26 and folders A13, A20, A14, A17, A21 and A24 and a function of returning access authorization information of a file or a folder publicized in response to an external inquiry.

The gateway server A10, as shown in FIG. 1, comprises a file server link information management unit A7 for managing a link or mount information of the file servers A11 and A12 to be managed, a file server structure information management unit A6 for managing structure information of a folder or a file on the file server, a file/folder filtering control unit A5 for filtering and appropriately changing structure information of a folder or a file managed by the file server structure information management unit A6 to an appropriate structure to present the obtained information to the client terminal A2 of a user A1 who accesses, a network file access control unit A4 for communicating with the client terminal A2 by a common file sharing protocol such as the CIFS protocol, and a user authentication information management unit A9 for connecting (correlating) the user A1 who accesses from the client terminal A2 and a user on the file servers A11 and A12.

The network file access control unit A4 has a function of communicating with the client terminal A2 by a common file sharing protocol such as the CIFS protocol and comprises a user authentication function unit A8 for executing user authentication of the user A1 who accesses from the client terminal A2.

The file server structure information management unit A6 has a memory structure for managing structure information of a folder or a file (file/folder structure information) on the file servers A11 and A12 and a function of inquiring of the file servers A11 and A12 managed by the file server link information management unit A7 about structure information of a file or a folder (file/folder structure information) at timing designated by a manager. Also provided is a function of enabling a manager to set inquiring timing, by which such inquiring timing can be set as at every fixed time interval, only upon an instruction or only at a specific event.

The file/folder filtering control unit A5 has a function of filtering file/folder structure information of the file servers A11 and A12 managed by the file server link information management unit A7 based on a user's access right to the relevant file or folder and extracting structure information of a file or a folder to be indicated to the user A1 (to be presented to the client terminal A2) to manage the extracted structure information of the file or the folder by using a structure.

The user authentication function unit A8 has a function of authenticating the user A1 who accesses from the client terminal A2 by using the information of the user authentication information management unit A9. The user authentication information management unit A9 has a function of managing information which correlates user information to the filer servers A11 and A12 and user information to the gateway server A10 of a user of the client terminal A2, information necessary for user authentication (e.g. user ID and password) and the like. Correlated, for example, are a user ID of a user who accesses the gateway server A10 and a user ID of a user on a file server. In other words, together with information necessary for user authentication, the user authentication information management unit A9 manages to which user information on the file server A11 or A12 a user authenticated on the gateway server A10 is correlated.

Operation of the First Exemplary Embodiment

Next, operation of thus configured first exemplary embodiment will be described with reference to FIG. 1 and FIG. 2.

Manager of the gateway server A10 in advance registers the file server A11 or A12 to be managed (identification information which uniquely identifies the file server A11 or A12) at the file server link information management unit A7 of the gateway server A10.

Thereafter, upon started, the gateway server A10 first executes operation of obtaining information of the file server A11, A12. More specifically, the gateway server A10 instructs the file server structure information management unit A6 to collect information of the file server A11, A12 (Step B1).

The file server structure information management unit A6 inquires about information of the file server A11 or A12 registered in the file server link information management unit A7 (Step B2). The file server link information management unit A7, which holds such a management table as shown in FIG. 3 in which a shared folder on the gateway server A10, a file server of a mounting destination and a shared folder on the file server are correlated with each other, returns the information of the table (Step B3).

The file server structure information management unit A6 in practice accesses the shared folder A13, A20 on the file server A11, A12 based on the returned information of the file server A11, A12 (Step B4) to obtain a list of the folders A14, A17, A21 and A24 and the files A15, A16, A18, A19, A22, A23, A25 and A26 in the shared holders A13 and A20 as information related to a shared folder, a sub-folder under the same and a file to be stored in the sub-folder (file/folder structure information) (Step B5).

At this time, recursively accessing a sub-folder under the shared folder to obtain information, if the volume of data of the file server is large, consumes much time. Therefore, at the timing of Step B4, as file/folder structure information, obtain information up to under the shared folder of the file server and under the sub-folder stored therein (i.e. two layers), for example. The obtained information is returned to the file server structure information management unit A6 and managed by using a structure having such a memory structure as shown in FIG. 6. From the file/folder structure information, a folder or a file on the file server A11, A12 can be uniquely specified. The file/folder structure information also includes attribute information of a file or a folder such as access authorization information for a file or a folder or the like.

On the other hand, operation will be described which is executed at an access from the client terminal A2 to the gateway server A10 ready for use.

The client terminal A2 accesses the gateway server A10 by using a common protocol for file sharing such as the SMB protocol or the CIFS protocol (Step B6).

At the gateway server A10, the network file access control unit A4 processes the access from the client terminal A2 (Step B7) and the network file access control unit A4 asks the user authentication function unit A8 for user authentication (Step B8).

The user authentication unit A8 inquires of the user authentication information management unit A9 about authentication information of the user (Step B9). The user authentication information management unit A9 having received the inquiry returns information necessary for user authentication, a user ID on a file server correlated with a user ID on the gateway server A10 or the like from its managed user authentication information (Step B10).

The user authentication information management unit A9 manages correlation information formed of a user ID (user information) on a file server to be correlated with a user ID on the gateway server A10 with a password on the file server added by such a table as shown in FIG. 4. User himself on the file server is managed by such a table as shown in FIG. 5 in which a user ID (user name) and a password are correlated. For an ID password management method and cooperation between a file server and a user ID, existing user information management and authentication cooperation function may be used such as Active Directory mounted on the Windows.

The user authentication function unit A8 determines whether to authenticate a user or not based on returned information to return the determination to the network file access control unit A4 together with the information returned from the user authentication information management unit A9 (Step B11).

Next, the network file access control unit A4 obtains file/folder structure information to be displayed on the client terminal A2 from the file/folder filtering control unit A5 in order to obtain file/folder structure information to be returned to the client terminal A2 (Step B12).

The file/folder filtering control unit A5 inquires of the file server structure information management unit A6 about file/folder structure information on the file server A11, A12 (Step B13).

The file server structure information management unit A6 returns structure information of its managed file or folder (Step B14).

The file/folder filtering control unit A5 extracts, out of the returned file/folder structure information, structure information of only a file or a folder whose access authorization to at least either one of read and write is given to a user currently accessing and returns the extracted information to the network file access control unit A4 (Step B15).

Information of a file or a folder to be returned is managed in an entity information structure having such a data structure as shown in FIG. 7. After once the information is formed at the file/folder information filtering control unit A5, the file/folder information filtering control unit A5 returns the held information to the network file access control unit A4 without inquiring of the file server structure information management unit A6.

The network file access control unit A4 returns structure information of the file or folder obtained from the file/folder information filtering control unit A5 to the client terminal 2. This causes the file or folder information to be displayed on the client terminal 2 as if a direct access is made to the file server A11, A12 (Steps B16 and B17).

The file server structure information management unit A6, by accessing the file server A11, A12 to inquire of the same without passing through the gateway server A10 (Step B18), obtains and updates the file/folder structure information managed by the file server A11, A12 in preparation for change of a file or a folder (Step B19). The acquisition of the file/folder structure information by the file server structure information management unit A6 is executed automatically and periodically, or at timing designated by a manager. When a file or a folder managed by the file server structure information management unit A6 has a change, the file server structure information management unit A6 notifies the file/folder filtering control unit A5 of a change of the file/folder structure information (Step B20).

Although the above-described description has been made of a case where when the client terminal A2 accesses the gateway server A10, the file server structure information management unit A6 already holds structure information of a file or a folder, next description will be made of a case where the file server structure information management unit A6, which fails to hold these information, inquiries of the file server A11, A12 about the information. Description will be made premised on that no authentication of the gateway server A10 is yet to be executed by the client terminal A2.

First, the client terminal A2 accesses the gateway server A10 by using a common protocol for file sharing such as SMB or CIFS (Step B21). In the gateway server A10, the network file access control unit A4 processes an access from the client terminal A2 (Step B22), and the network file access control unit A4 obtains structure information of a file or a folder to be displayed on the client terminal A2 from the file/folder filtering control unit A5 in order to obtain structure information of a file or a folder to be returned to the client terminal A2 (Step B23).

The file/folder filtering control unit A5 inquires of the file server structure information management unit A6 about structure information of a file or a folder on the file server A11, A12 (Step B24). When the file server structure information management unit A6 fails to hold the inquired information, inquire of the file server A11, A12 about the file/folder structure information (Step B25). Such a situation occurs when accessing a file in a folder of one-layer lower layer in a list of files or folders in the folder returned by the above-described procedures from Step B6 to Step B17.

The file server A11, A12 returns the structure information of the file or folder to the file server structure information management unit A6 (Step B26). The file server structure information management unit A6 adds the returned information to an entity information structure having such a data structure as shown in FIG. 6. The file server structure information management unit A6 returns its managed file/folder structure information (Step B27).

The file/folder filtering control unit A5 extracts, out of the returned file/folder structure information, structure information of only a file or a folder whose access authorization to at least either one of read and write is given to a user currently accessing and returns the extracted information to the network file access control unit A4 (Step B28). The network file access control unit A4 returns the file or the folder structure information to the client terminal 2, and the client terminal 2 displays the file or folder information as if a direct access is made to the file server A11, A12 (Steps B29 and B30).

Structure shown in FIG. 6 will be detailed. FIG. 6(A) and FIG. 6(B) show a current information structure C1 and an entity information structure C11 as a data structure to be managed in the file server structure information management unit A6.

When the file servers A11 and A12 are mounted on the gateway server A10 as shown in FIG. 1, a state of a memory of the file server structure information management unit A6 formed using the current information structure C1 shown in FIG. 6(A) and the entity information structure C11 shown in FIG. 6(B) will be as illustrated in an structure example C12 of an entity information structure shown in FIG. 6(C). Illustrated in the structure example C12 of the entity information structure shown in FIG. 6(C) are structures of information of an individual entity such as the shared holders A13 and A20 of the file servers A11 and A12 and folders and files under the same and structures of pointers to upper and lower layer entities and adjacent entities.

"Kind C4" of the entity information structure C11 shown in FIG. 6(B) represents that information stored in the structure itself is file information or folder information. In a case of file information, "f" is stored and in a case of folder information, "d" is stored. Stored in "name C5" is a name of a file or a folder. Stored in "authorization information C6" is authorization information applied to a file or a folder. "Next C7" represents a pointer to a similar structure that represents a folder subsequent to a file or a folder indicated by the structure. "Prey C8" represents a pointer to a similar structure that represents a folder precedent to a file or a folder indicated by the structure. "Child C9" represents a pointer to a similar structure that represents a folder stored under a file or a folder indicated by the structure. "Parent C10" represents a pointer to a similar structure that represents a parent folder or file of a file or a folder indicated by the structure. "Front C13" represents a pointer to a structure which represents a corresponding file or folder in an structure example C23 of the entity information structure shown in FIG. 7(B) which represents structure information of a file or a folder managed by the file/folder information filtering control unit A5.

Structure shown in FIG. 7 will be detailed. FIG. 7(A) shows an entity information structure C14 as a data structure to be managed in the file/folder information filtering control unit A5.

When the file servers A11 and A12 are mounted on the gateway server A10 as shown in FIG. 1, a state of a memory of the file/folder information filtering control unit A5 formed using the current information structure C1 shown in FIG. 6(A) and the entity information structure C14 shown in FIG. 7(A) will be as illustrated in the structure example C23 of an entity information structure shown in FIG. 7(B).

Illustrated in the entity information structure C14 shown in FIG. 7(A) are structures of information of an individual entity such as the shared holders A13 and A20 of the file servers A11 and A12 and folders and files under the same and structures of pointers to upper and lower layer entities and adjacent entities.

"Kind C15" of the entity information structure C14 shown in FIG. 7(A) represents that information stored in the structure itself is file information or folder information. In a case of file information, "f" is stored and in a case of folder information, "d" is stored. Stored in "name C16" is a name of a file or a folder. Stored in "authorization information C17" is authorization information applied to a file or a folder. "Next C18" represents a pointer to a similar structure that represents a folder subsequent to a file or a folder indicated by the structure. "Prey C19" represents a pointer to a similar structure that represents a folder precedent to a file or a folder indicated by the structure. "Child C20" represents a pointer to a similar structure that represents a folder stored under a file or a folder indicated by the structure. "Parent C21" represents a pointer to a similar structure that represents a parent folder or file of a file or a folder indicated by the structure. "Back C22" represents a pointer to a structure which represents a corresponding file or folder in the structure example C12 of the entity information structure shown in FIG. 6(C) which is a structure representing structure information of a file or a folder managed by the file server structure information management unit A6.

FIG. 8 shows one example where when the client terminal A2 of the user A accesses the gateway server A10, only a file and a folder whose access authorization is held by the user A accessing the gateway server A10 are displayed.

In FIG. 8, among file/folder structure information of the file servers A11 and A12, structure information of a file or a folder whose access authorization is held by the user A is filtered by the file/folder filtering control unit A5 of the gateway server A10 to present contents of the file and the folder with the user A attached to the client terminal A2.

In this example, as to the file A23 of the shared folder A20, for example, because the user A fails to have access authorization as shown in FIG. 7(B), the file A23 is not displayed on the client terminal A2 of the user A1 in FIG. 8.

Figure 9:
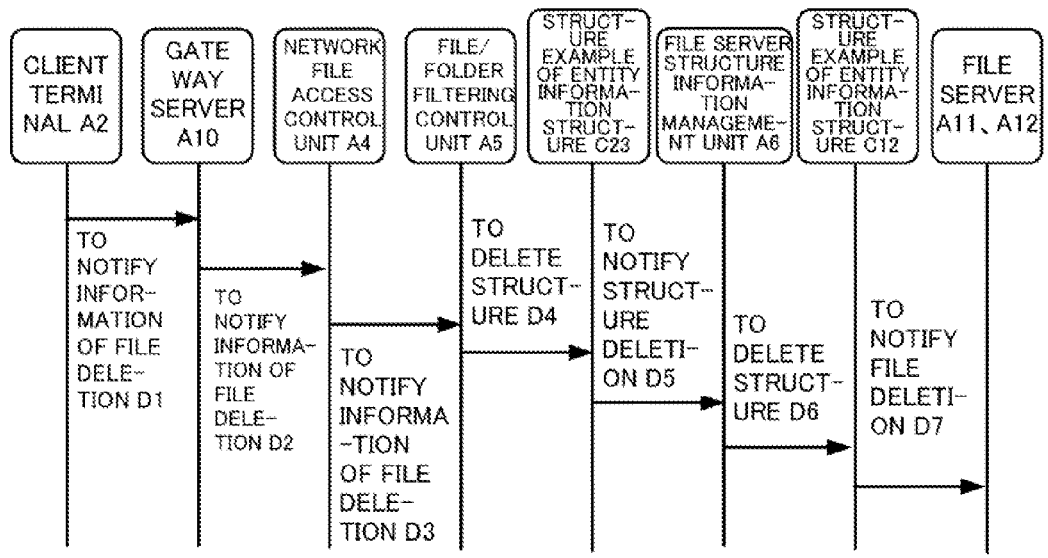
FIG. 9 is a timing chart for use in explaining how a file structure is transmitted when a user adds or deletes a file or changes folder structure with respect to a file and a holder displayed on a client terminal side.

Next, description will be made of how a file structure is transmitted when the user A1 executes file addition, deletion or folder structure change with respect to a file or a folder displayed on the client terminal A2 with reference to FIG. 9.

Description will be here made of operation to be executed when the user A1 accesses the gateway server A10 from the client terminal A2 to delete the file A15.

Figure 2:
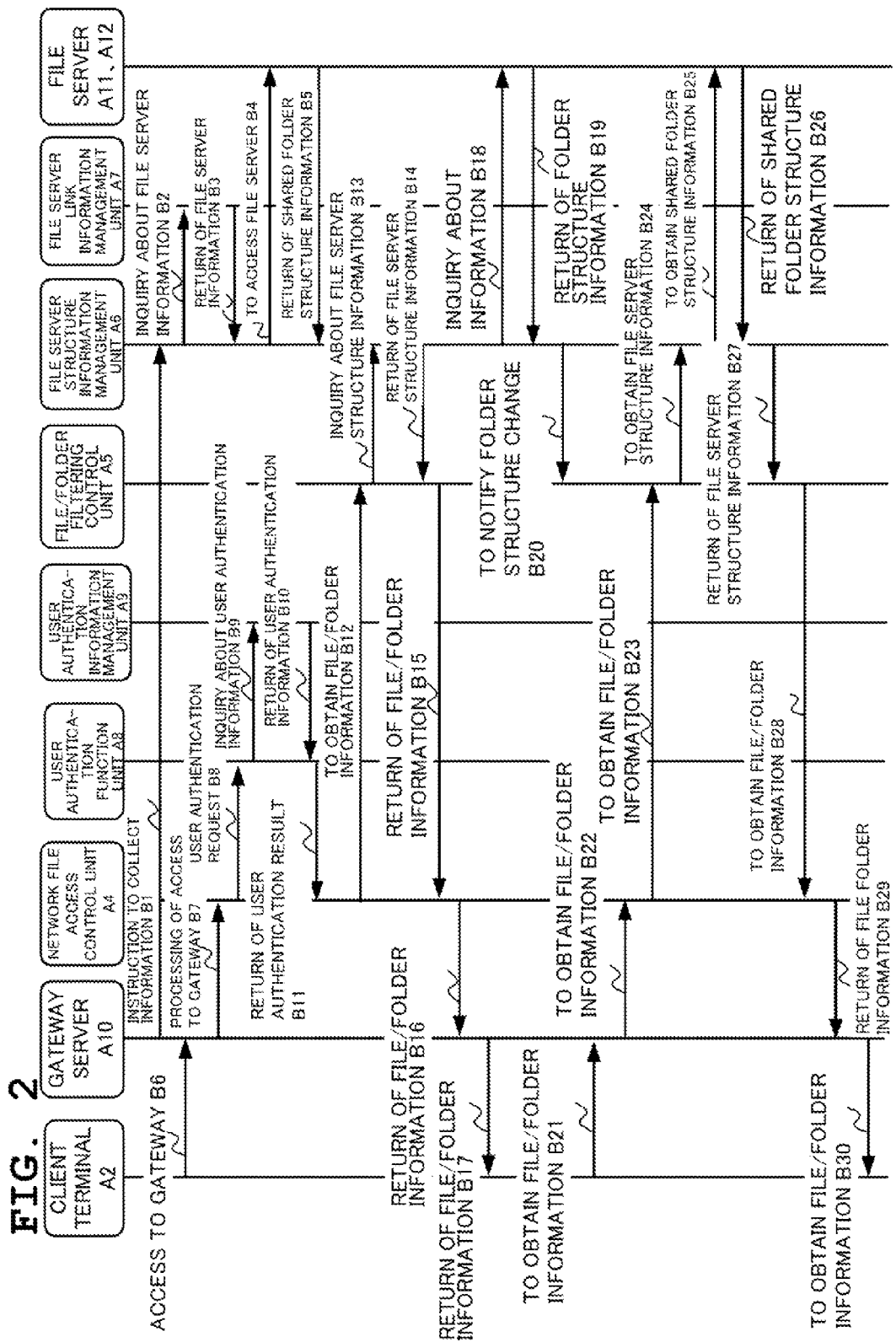
FIG. 2 is a timing chart for use in explaining operation of a gateway server according to the first exemplary embodiment.

The same as Steps B1 through B17 shown in FIG. 2 are steps up to where a file or a folder is displayed on the client terminal A2 after the user A1 accesses the gateway server A10 from the client terminal A2 to complete authentication.

When the user A1 deletes the file A15, the client terminal A2 notifies the gateway server A10 of information of the deletion according to a common protocol for file access such as CIFS (Step D1).

The information of the deletion is notified to the file/folder filtering control unit A5 through the network file access control unit A4 (Steps D2 and D3).

The file/folder filtering control unit A5 deletes the entity information structure C14 corresponding to the file A15 designated by the deletion information out of the structure example C23 of the entity information structure in the file/folder filtering control unit A5 which is to be displayed on the client terminal A2 (Step D4).

Upon deletion, the file/folder filtering control unit A5 notifies the file server structure information management unit A6 of the deletion of the file A15 (Step D5).

Upon receiving the notification, in the structure example C12 of the entity information structure in the memory in the file server structure information management unit A6 which leads to the top of the "back C22" pointer of the entity information structure C23 of the file A15, the file server structure information management unit A6 deletes the entity information structure C11 corresponding to the file A15 (Step D6).

When deleting a memory structure in the file/folder filtering control unit A5 or the file server structure information management unit A6, each pointer of "Next C7", "Prey C8", "Child C9" and "Parent C10" in the entity information structure C11 and each pointer of "Next C18", "Prey C19", "Child C20" and "Parent C21" in the entity information structure C14 are renewed.

The file server structure information management unit A6 notifies the file server A11 of the deletion of the file A15 (Step D7). The file server A11 deletes the file A15 according to the notification of the file deletion.

Figure 10:
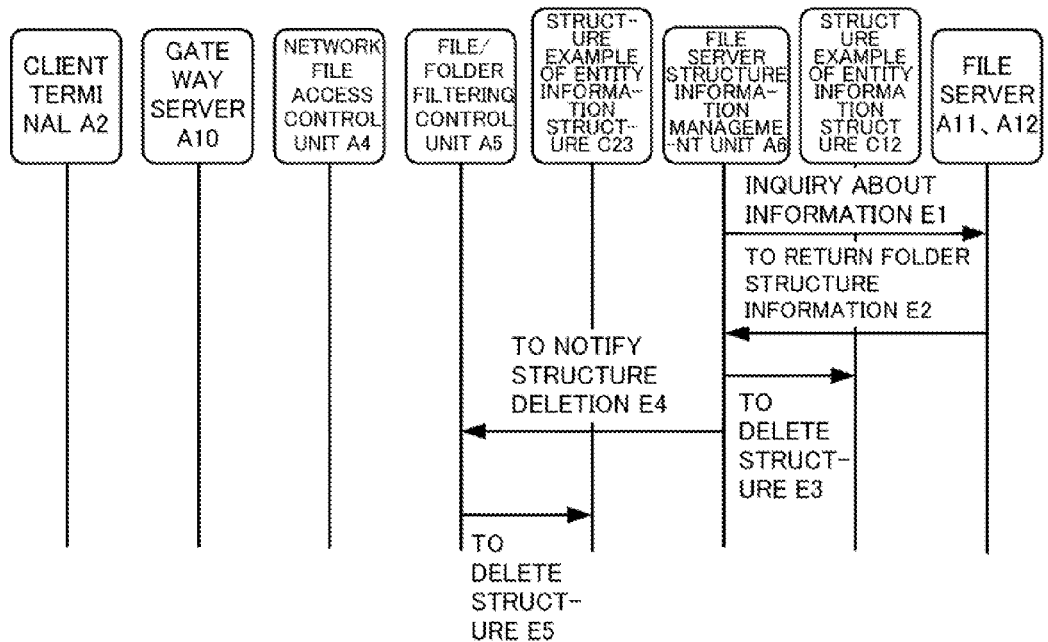
FIG. 10 is a timing chart for use in explaining operation of a file holder filtering control unit and the file server structure information management unit when a file or a folder of the file server is changed according to the first exemplary embodiment.

Next, description will be made of operation of the file/folder filtering control unit A5 and the file server structure information management unit A6 to be executed when a file or a folder of the file server A12 is changed with reference to FIG. 10.

Here, description will be made of a case where the file A25 on the file server A12 is deleted.

After the file A25 is deleted on the file server A12, when the file server structure information management unit A6 of the gateway server A10 makes an inquiry about information (Step E1), the file server A12 returns structure information of a file or a folder to the file server structure information management unit A6 (Step E2).

Since the file A25 fails to exist then, the file server structure information management unit A6 deletes the entity information structure C11 corresponding to the file A25 in the structure example C12 of the entity information structure of the file server structure information management unit A6 (Step E3).

When the structure is deleted, the file server structure information management unit A6 notifies the file/folder filtering control unit A5 of the deletion of the file A25 (Step E4).

When the entity information structure C14 corresponding to the file 25 exists in the structure example C23 of the corresponding entity information structure in the file/folder filtering control unit A5 which is indicated by the "front C13" pointer of the entity information structure C11, the file/folder filtering control unit A5 having received the notification deletes the relevant entity information structure C14 (Step E5).

Effects of the First Exemplary Embodiment

In the following, effects of the first exemplary embodiment will be described.

The present exemplary embodiment enables folder or file structure on the file server to be flexibly changed and displayed such as displaying only a file or folder related to a user who makes an access by using existing file server and client terminal without introducing a new function to the file server and the client terminal. This produces the effect of improving facility such as efficient access to a file which can be used by a user even in a case of a server in which a large volume of files of a plurality of users are stored.

Moreover, since realizing the effect by a gateway server arranged between a file server and a client terminal eliminates the need of introduction of a new function such as installation of a module into a file server or a client terminal, application is easy.

Furthermore, although directly changing file or folder structure on a file server without through a gateway server might cause contradiction between information of file or folder structure displayed through the gateway and information of file or folder structure on the file server, the present exemplary embodiment resolves such contradiction and even when a gateway server is introduced, realizes file management maintaining consistency because it is configured to reflect a change on the file server onto the gateway side at appropriate timing.

Second Exemplary Embodiment

In the following, a file management system according to a second exemplary embodiment of the present invention will be described.

The second exemplary embodiment relates to transmission of change information to the gateway server A10 in real time when a file or a folder is changed on the file server A11 or A12 side.

Figure 11:
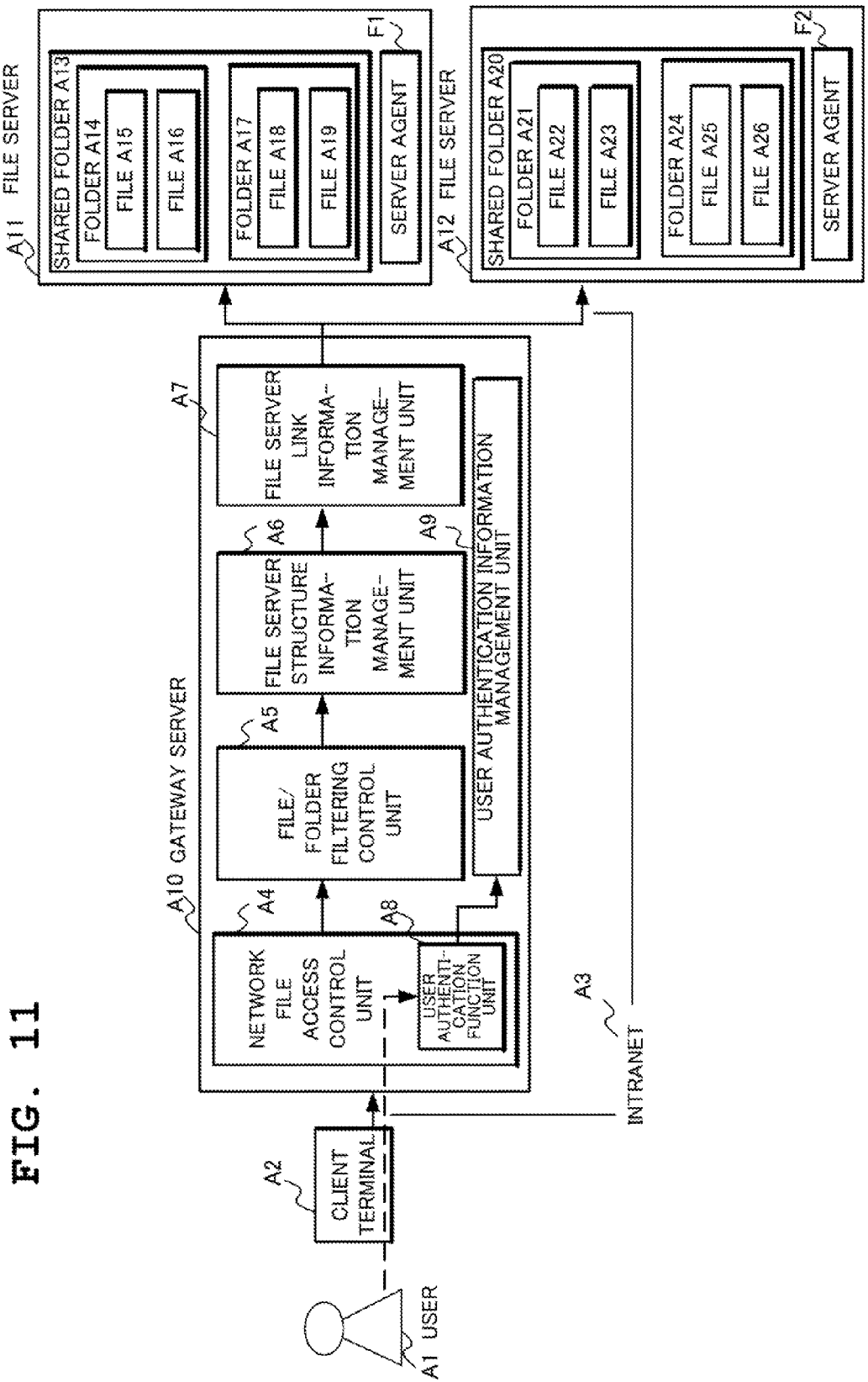
FIG. 11 is a block diagram showing an example of configuration of a file management system according to a second exemplary embodiment of the present invention.

FIG. 11 shows an example of configuration of the file management system according to the second exemplary embodiment of the present invention. The file management system according to the second exemplary embodiment, similarly to the first exemplary embodiment shown in FIG. 1, comprises the client terminal A2, the gateway server A10, the file servers A11 and A12 and the communication network A3 such as an intranet.

The second exemplary embodiment differs from the first exemplary embodiment in that the file servers A11 and A12 have server agents F1 and F2, respectively. Since the other part of the configuration is the same as that of the first exemplary embodiment, no description will be made thereof.

The server agents F1 and F2 are monitoring units having a function of monitoring a file I/O on the file servers A11 and A12, which have a function of monitoring such operation of deletion of a file or a folder on the file servers A11 and A12, change of a file name or a folder name, new creation of a file or a folder and shift of a file or a folder and upon detecting the operation, notifying information of the same to the file server structure information management unit A6 of the gateway server A10.

Operation of the Second Exemplary Embodiment

Description will be made of operation to be executed when deletion, new creation, shift or the like is executed with respect to a file of the file servers A11 and A12 with reference to FIG. 12.

Figure 12:
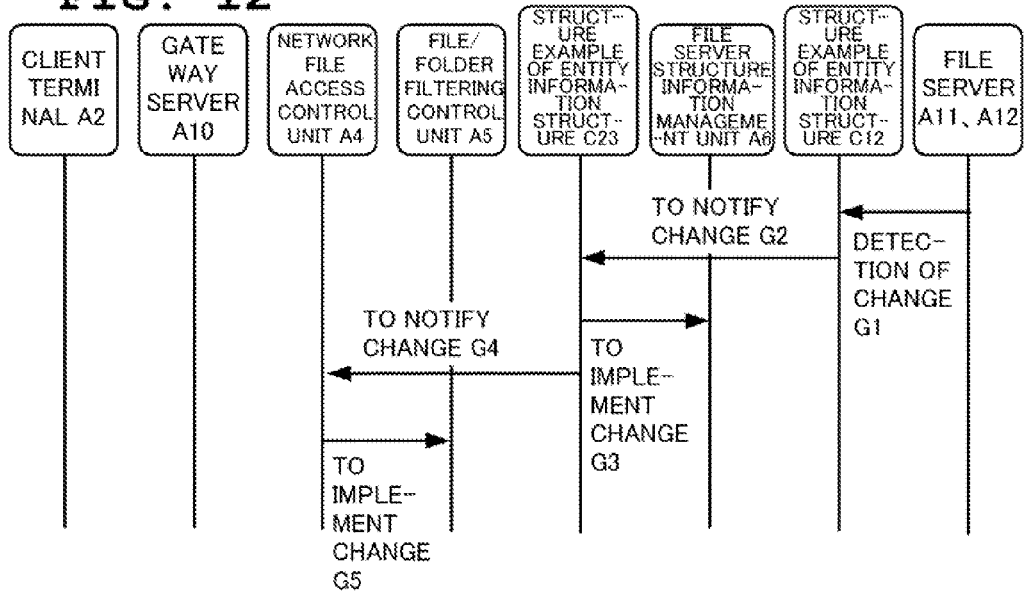
FIG. 12 is a timing chart for use in explaining operation to be executed when deletion, new creation, shift and the like are executed with respect to a file of a file server according to the second exemplary embodiment.

In FIG. 12, when deletion, new creation, shift or the like is executed with respect to a file of the file servers A11 and A12 in FIG. 12, the server agent F1, F2 detects the operation (Step G1).

Upon detecting deletion, new creation or shift of a file or a folder, the server agent F1, F2 notifies the file server structure information management unit A6 of the change through the file server A11, A12 (Step G2). Notification of a change includes detailed information such as which folder executes which operation.

The file server structure information management unit A6 having received the notification of the change adds the change to the structure example C12 of the entity information structure according to the information included in the notification contents (Step G3).

For changing the structure example C23 of the entity information structure according to the update of the structure example C12 of the entity information structure, the file server structure information management unit A6 notifies the file/folder filtering control unit A5 of the change (Step G4).

The file/folder filtering control unit A5 notified of the update adds the change to the structure example C23 of the entity information structure (Step G5).

According to above-mentioned operation, even when a change is made to folder structure and existence or position of a file on the side of the file servers A11 and A12, the gateway server A10 is instantly notified of the update to allow the user A1 to constantly display a file or a folder based on the latest state of the file server.

Effects of the Second Exemplary Embodiment

In the following, effects of the second exemplary embodiment will be described.

In addition to the effects attained by the first exemplary embodiment, providing the file server with the server agent which monitors such operation of deletion of a file or a folder, change of a file name or a folder name, new creation of a file or a folder and shift of a file or a folder on the file server and detects the operation to notify the gateway server of the operation enables information about change to be transmitted to the gateway server in real time when a change is made to a file or a folder of the file server.

Figure 13:
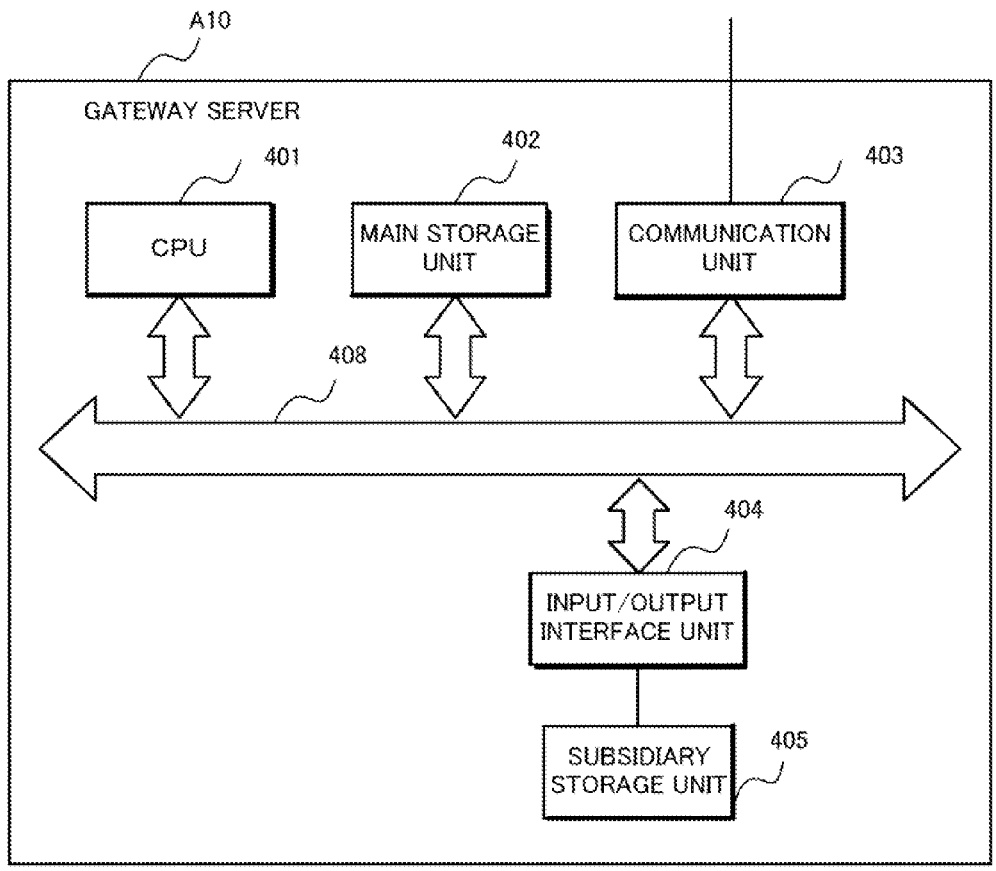
FIG. 13 is a block diagram showing an example of hardware configuration of a gateway server A10 according to the first and second exemplary embodiments.

FIG. 13 is a block diagram showing an example of a hardware configuration of the gateway server A10 according to the first and second exemplary embodiments.

With reference to FIG. 13, the gateway server A10, which can be realized by the same hardware configuration as that of a common computer device, comprises a CPU (Central Processing Unit) 401, a main storage unit 402 formed of a RAM (Random Access Memory) or the like for use as a data working region or a data temporary saving region, a communication unit 403 for transmitting/receiving data to/from other node through a network, an input/output interface unit 404 connected with an external device to transmit/receive data, a subsidiary storage unit 405 which is a hard disk device formed of a non-volatile memory such as a ROM (Read Only Memory), a magnetic disk or a semiconductor memory, and a system bus 408 for connecting the above-described respective components with each other.

The gateway server A10 according to the present exemplary embodiment has its operation realized not only in hardware with a circuit part mounted which is a hardware part such an LS1 (Large Scale Integration) with a file management program incorporated which executes processing of such components as the file server link information management unit A7, the file server structure information management unit A6, the file/folder filtering control unit A5, the network file access control unit A4 and the user authentication information management unit A9 but also in software by storing, in the subsidiary storage unit 405, a file management program which provides the function of each component of the gateway server A10 and loading the same into the main storage unit 402 to execute the same by the CPU 401.

While the present invention has been described with respect to the preferred exemplary embodiments in the foregoing, the present invention is not necessarily limited to the above-described exemplary embodiments, but can be implemented in various forms without departing from the scope of the technical idea.

What is claimed is:

1. A gateway server connected to a file server and a client terminal through a network, comprising:

a unit that filters structure information of a folder and a file stored in said file server has based on access authorization of a user of said client terminal on said user basis and presents the filtered structure information of said folder and file to said client terminal of a user who has access authorization for the folder and the file, wherein said unit comprises:

a file server structure information management unit that obtains and manages structure information of said folder and file on said file server; and a file and folder filtering control unit that filters the structure information of said folder and file obtained by said file server structure information management unit based on the access authorization of the user of said client terminal and provides the obtained information to said client terminal, wherein said file server structure information management unit holds the obtained structure information of the folder and the file of said file server by a predetermined data structure, and said file and folder filtering control unit filters the structure information of said folder and file obtained by said file server structure information management unit based on the access authorization of the user of said client terminal and extracts structure information of the folder and the file to be presented to the client terminal of said user to hold the extracted structure information of the folder and the file by a predetermined data structure, and wherein the access authorization of the user is to at least either one of read and write to said folder and file, wherein when the structure information of said folder and file filtered and presented to said client terminal is changed by said client terminal, said file and folder filtering control unit receives change information for the structure information of said folder and file from said client terminal to update the structure information of said folder and file managed, and upon receiving a notification from said file and folder filtering control unit, said file server structure information management unit updates the structure information of said folder and file and notifies change information for the structure information of said folder and file to said file server having the updated structure information of said folder and file.

2. The gateway server according to claim 1, wherein said file server structure information management unit obtains a change of said file and folder from said file server at predetermined timing to update the structure information of said folder and file managed, and upon receiving a notification from said file server structure information management unit, said file and folder filtering control unit updates the filtered structure information of said folder and file.

3. The gateway server according to claim 2, wherein said file server structure information management unit periodically obtains the structure information of said folder and file on said file server and when a change is made to the structure information of said folder and file, updates the structure information of said folder and file managed to notify said file and folder filtering control unit of the change of the structure information of said folder and file.

4. The gateway server according to claim 1, comprising:
a user authentication information management unit for managing, as user authentication information, information correlating user information to said file server and user information to said gateway server which are of the user of said client terminal, and information necessary for user authentication; and
a user authentication function unit for executing user authentication of a user who makes an access from said client terminal by using the information of said user authentication information management unit.

5. A file management system including a file server, a gateway server and a client terminal which accesses a folder and a file on said file server through said gateway server, wherein
said gateway server comprises a unit that filters structure information of a folder and a file that said file server has based on access authorization of a user of said client terminal on said user basis and presents the filtered structure information of said folder and file to said client terminal of a user who has access authorization for the folder and the file,
wherein said gateway server comprises
a file server structure information management unit for obtaining and managing structure information of said folder and file on said file server, and
a file and folder filtering control unit for filtering the structure information of said folder and file obtained by said file server structure information management unit based on the access authorization of the user of said client terminal and providing said client terminal with the obtained information,
wherein said file server structure information management unit holds the obtained structure information of the folder and the file of said file server by a predetermined data structure, and
said file and folder filtering control unit filters the structure information of said folder and file obtained by said file server structure information management unit based on the access authorization of the user of said client terminal and extracts structure information of the folder and the file to be presented to the client terminal of said user to hold the extracted structure information of the folder and the file by a predetermined data structure, and
wherein the access authorization of the user is to at least either one of read and write to said folder and file,
wherein when the structure information of said folder and file filtered and presented to said client terminal is changed by said client terminal,
said file and folder filtering control unit receives change information for the structure information of said folder and file from said client terminal to update the structure information of said folder and file managed, and
upon receiving a notification from said file and folder filtering control unit, said file server structure information management unit updates the structure information of said folder and file and notifies change information for the structure information of said folder and file to said file server having the updated structure information of said folder and file.

6. The file management system according to claim 5, wherein
said file server structure information management unit obtains a change of said file and folder from said file server at predetermined timing to update the structure information of said folder and file managed, and
upon receiving a notification from said file server structure information management unit, said file and folder filtering control unit updates the filtered structure information of said folder and file.

7. The file management system according to claim 6, wherein
said file server structure information management unit periodically obtains the structure information of said folder and file on said file server and when a change is made to the structure information of said folder and file, updates the structure information of said folder and file managed to notify said file and folder filtering control unit of the change of the structure information of said folder and file.

8. The file management system according to claim 5, wherein said gateway server comprises
a user authentication information management unit for managing, as user authentication information, information correlating user information to said file server and user information to said gateway server which are of the user of said client terminal, and information necessary for user authentication, and
a user authentication function unit for executing user authentication of a user who makes an access from said client terminal by using the information of said user authentication information management unit.

9. The file management system according to claim 5, wherein said file server comprises a monitoring unit for monitoring a change to structure information of a folder and a file on said file server and notifying the detected change information to said file server structure information management unit of said gateway server.

10. A file management method of a file management system including a file server, a gateway server and a client terminal which accesses a folder and a file on said file server through said gateway server, wherein
at said gateway server, filtering structure information of a folder and a file stored in said file server has based on access authorization of a user of said client terminal on said user basis and presenting the filtered structure information of said folder and file to said client terminal of a user who has access authorization for the folder and the file,
at said gateway server, a file server structure information management step of obtaining and managing structure information of said folder and file on said file server; and
at said gateway server, a filtering step of filtering the structure information of said folder and file obtained by said file server structure information management unit based on the access authorization of the user of said client terminal and provides the obtained information to said client terminal, and
wherein the access authorization of the user is to at least either one of read and write to said folder and file,
wherein at said file server structure information management step, the obtained structure information of the folder and the file of said file server is held by a predetermined data structure, and
at said filtering step, filtering the structure information of said folder and file obtained by said file server structure information management step based on the access authorization of the user of said client terminal, extracting structure information of the folder and the file to be presented to the client terminal of said user and holding the extracted structure information of the folder and the file by a predetermined data structure, wherein when the structure information of said folder and file filtered and presented to said client terminal is changed by said client terminal, at said filtering step, receiving change information for the structure information of said folder and file is received from said client terminal and updating the structure information of said folder and file managed, and at said file server structure information management step, upon receiving a notification from said filtering step, updating the structure information of said folder and file and notifying change information for the structure information of said folder and file to said file server having the updated structure information of said folder and file.

11. The file management method according to claim 10, wherein at said file server structure information management step, obtaining a change of said file and folder from said file server at predetermined timing and updating the structure information of said folder and file managed, and at said filtering step, upon receiving a notification from said file server structure information management step, updating the filtered structure information of said folder and file.

12. The file management method according to claim 11, wherein at said file server structure information management step, obtaining the structure information of said folder and file on said file server periodically and when a change is made to the structure information of said folder and file, updating the structure information of said folder and file managed and notifying said filtering step of the change of the structure information of said folder and file.

13. The file management method according to claim 10, wherein at said gateway server managing, as user authentication information, information correlating user information to said file server and user information to said gateway server which are of the user of said client terminal, and information necessary for user authentication, and executing user authentication of a user who makes an access from said client terminal by using the information necessary for said user authentication.

14. The file management method according to claim 10, wherein at said file server, monitoring a change to structure information of a folder and a file on said file server and notifying said gateway server of the detected change information.

15. A non-transitory computer readable medium storing a file management program operable on a gateway server connected to a file server and a client terminal through a network, wherein said file management program causes said gateway server to execute a processing of filtering structure information of a folder and a file stored in said file server has based on access authorization of a user of said client terminal on said user basis and presenting the filtered structure information of said folder and file to said client terminal of a user who has access authorization for the folder and the file, wherein said file management program causes said gateway server to execute a file server structure information management processing of obtaining and managing structure information of said folder and file on said file server, and a filtering processing of filtering the structure information of said folder and file obtained by said file server structure information management unit based on the access authorization of the user of said client terminal and providing said client terminal with the obtained information, wherein at said file server structure information management processing, the obtained structure information of the folder and the file of said file server is held by a predetermined data structure, and at said filtering processing, filtering the structure information of said folder and file obtained by said file server structure information management processing based on the access authorization of the user of said client terminal, extracting structure information of the folder and the file to be presented to the client terminal of said user and holding the extracted structure information of the folder and the file by a predetermined data structure, and wherein the access authorization of the user is to at least either one of read and write to said folder and file, wherein when the structure information of said folder and file filtered and presented to said client terminal is changed by said client terminal, at said filtering processing, receiving change information for the structure information of said folder and file from said client terminal and updating the structure information of said folder and file managed, and at said file server structure information management processing, upon receiving a notification from said filtering processing, updating the structure information of said folder and file and notifying change information for the structure information of said folder and file to said file server having the updated structure information of said folder and file.

16. The non-transitory computer readable medium according to claim 15, wherein at said file server structure information management processing, obtaining a change of said file and folder from said file server at predetermined timing and updating the structure information of said folder and file managed, and at said filtering processing, upon receiving a notification from said file server structure information management processing, updating the filtered structure information of said folder and file.

17. The non-transitory computer readable medium according to claim 16, wherein at said file server structure information management processing, obtaining the structure information of said folder and file on said file server periodically and when a change is made to the structure information of said folder and file, updating the structure information of said folder and file managed and notifying said filtering processing of the change of the structure information of said folder and file.

18. The non-transitory computer readable medium according to claim 15, wherein said file management program causes said gateway server to execute a processing of managing, as user authentication information, information correlating user information to said file server and user information to said gateway server which are of the user of said client terminal, and information necessary for user authentication, and a processing of executing user authentication of a user who makes an access from said client terminal by using the information necessary for said user authentication.

* * * * *